United States Patent
Culpi et al.

(10) Patent No.: US 8,194,076 B2
(45) Date of Patent: *Jun. 5, 2012

(54) AUTO-SCALING STRIP CHART

(75) Inventors: William Culpi, Lake Forest, CA (US); William E. Bryant, Chino Hills, CA (US); John M. Rickman, Portola, CA (US)

(73) Assignee: Newport Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/187,280

(22) Filed: Jul. 20, 2011

(65) Prior Publication Data

US 2011/0273478 A1    Nov. 10, 2011

Related U.S. Application Data

(63) Continuation of application No. 11/624,151, filed on Jan. 17, 2007, now Pat. No. 8,004,527.

(60) Provisional application No. 60/760,443, filed on Jan. 20, 2006.

(51) Int. Cl.
G09G 5/22 (2006.01)

(52) U.S. Cl. .................. 345/440.2; 345/440; 345/440.1; 345/660; 345/661; 340/815.4; 324/76.11; 324/103 R

(58) Field of Classification Search .................. 715/716; 398/5; 705/37; 382/298; 702/3; 436/43; 345/35, 440.2

See application file for complete search history.

(56) References Cited

U.S. PATENT DOCUMENTS

| 3,487,263 | A | * | 12/1969 | Pahlavan ........................ 315/174 |
| 5,019,977 | A | | 5/1991 | LaPointe et al. |
| 5,296,869 | A | * | 3/1994 | Jonker et al. ..................... 345/24 |
| 5,339,392 | A | * | 8/1994 | Risberg et al. ................. 715/762 |
| 5,825,516 | A | * | 10/1998 | Walsh ............................. 398/40 |
| 5,966,139 | A | * | 10/1999 | Anupam et al. ............... 345/440 |
| 6,085,202 | A | * | 7/2000 | Rao et al. ....................... 715/201 |
| 6,246,965 | B1 | | 6/2001 | Cockerham et al. |
| 6,400,366 | B1 | | 6/2002 | Davies et al. |
| 6,483,291 | B1 | * | 11/2002 | Bhateja et al. ................. 324/142 |
| 6,532,024 | B1 | | 3/2003 | Everett et al. |
| 6,667,743 | B2 | * | 12/2003 | Bertram et al. ............... 345/440 |
| 6,975,306 | B2 | | 12/2005 | Hinckley et al. |
| 8,004,527 | B2 | | 8/2011 | Culpi et al. |
| 2002/0063712 | A1 | * | 5/2002 | Ilic ................................. 345/440 |
| 2002/0161853 | A1 | | 10/2002 | Burak et al. |
| 2002/0178258 | A1 | | 11/2002 | Hushing et al. |
| 2003/0030862 | A1 | | 2/2003 | Trier et al. |
| 2003/0235919 | A1 | | 12/2003 | Chandler |
| 2004/0223058 | A1 | | 11/2004 | Richter et al. |
| 2005/0074185 | A1 | * | 4/2005 | Jung et al. ..................... 382/298 |

(Continued)

*Primary Examiner* — Xiao M. Wu
*Assistant Examiner* — Phi Hoang
(74) *Attorney, Agent, or Firm* — Stoel Rives LLP

(57) ABSTRACT

Systems and methods are disclosed for displaying a strip chart on an electronic display. A furthest extremum value of the measured quantity is recorded over a period of time and a plurality of values of the measured quantity are displayed on the strip chart. The furthest extremum value is used to automatically rescale the strip chart, providing for at least one bound of the zoomed range. In response to receiving a selection of a zoom factor defining a degree of magnification of the strip chart, the strip chart is automatically scaled to a degree of magnification commensurate with the zoom factor and the strip chart may be automatically scaled such that the strip chart is bounded on one side by one of a furthest extremum maximum or minimum value and the other one of the furthest extremum maximum or minimum value is not displayed on the strip chart.

27 Claims, 11 Drawing Sheets

U.S. PATENT DOCUMENTS

| | | | |
|---|---|---|---|
| 2005/0169436 A1* | 8/2005 | Balkman | 379/24 |
| 2006/0050090 A1* | 3/2006 | Ahmed et al. | 345/660 |
| 2007/0156565 A1* | 7/2007 | Singer et al. | 705/37 |
| 2007/0176933 A1 | 8/2007 | Culpi et al. | |

* cited by examiner

AUTO-SCALING STRIP CHART

RELATED APPLICATIONS

This application is a continuation of and claims priority to U.S. application Ser. No. 11/624,151, filed Jan. 17, 2007, which claims priority from U.S. Provisional Application No. 60/760,443, filed Jan. 20, 2006. The entire teachings of each of the above applications are incorporated herein by reference.

TECHNICAL FIELD

The present disclosure relates generally to the display of measured quantities, and more specifically, but not exclusively, to self-centering bar graph scales and to auto-scaling charts.

BACKGROUND INFORMATION

Since the beginning of scientific study and research, measuring devices have been developed to help scientists and engineers to advance scientific knowledge and to help them invent. Thus, there has been a need to meaningfully display metrology data for accurate tracking and study of that data for furtherance of scientific pursuit and technological innovation. A bar graph is typically employed to give a better visual representation of a numerical value. Bar graphs are also common on computer displays to indicate the degree of completion of a task, or in contrast, to plot data using a spreadsheet or graphics plotting program. Charts also provide at least a two-dimensional picture of data, which usually is nothing more than a plurality of bar graphs of a first variable charted over a second variable. Thus, bar graphs and other charts may be useful tools with which to analyze any quantifiable data.

SUMMARY OF THE DISCLOSURE

According to one embodiment, a method for displaying a strip chart on an electronic display comprises recording over a period of time a furthest extremum maximum value of a measured quantity and a furthest extremum minimum value of the measured quantity, receiving a selection of a zoom factor defining a degree of magnification of the strip chart, and, in response to receiving the selection of the zoom factor, displaying, via the electronic display, a plurality of values of the measured quantity on the strip chart, wherein the strip chart is automatically rescaled such that the strip chart is bounded on opposing sides by respective first and second values, the first value comprises one of the furthest extremum maximum value or the furthest extremum minimum value, and the second value is automatically scaled based on the first value and the zoom factor so that the strip chart has a degree of magnification commensurate with the zoom factor and the other one of the furthest extremum maximum value or the furthest extremum minimum value is not displayed on the strip chart.

According to another embodiment, a computer-readable medium for use with a measuring device that records over a period of time furthest extremum maximum and minimum values of a measured quantity is provided. The computer-readable medium has instructions stored thereon for displaying a plurality of values of the measured quantity on a strip chart in response to receiving a selection of a zoom factor defining a degree of magnification of the strip chart. The instructions comprise instructions for, in response to receiving the selection of the zoom factor, displaying a plurality of values of the measured quantity on the strip chart, wherein the strip chart is automatically rescaled such that the strip chart is bounded on opposing sides by respective first and second values, the first value comprises one of the furthest extremum maximum value or the furthest extremum minimum value, and the second value is automatically scaled based on the first value and the zoom factor so that the strip chart has a degree of magnification commensurate with the zoom factor and the other one of the furthest extremum maximum value or the furthest extremum minimum value is not displayed on the strip chart.

According to yet another embodiment, a system comprises a display configured to display a plurality of values of a measured quantity on a strip chart and a measuring device in operative association with the display. The measuring device is configured to record over a period of time a furthest extremum maximum value of the measured quantity and a furthest extremum minimum value of the measured quantity, receive a selection of a zoom factor defining a degree of magnification of the strip chart, and in response to receiving the selection of the zoom factor, display, via the display, a plurality of values of the measured quantity on the strip chart, wherein the strip chart is automatically scaled to a degree of magnification commensurate with the zoom factor and the strip chart is automatically scaled such that the strip chart is bounded on one side by one of the furthest extremum maximum value or the furthest extremum minimum value and the other one of the furthest extremum maximum value or the furthest extremum minimum value is not displayed on the strip chart.

According to still another embodiment, a system is provided for displaying a plurality of values of the measured quantity on a strip chart. The system comprises a means for recording over a period of time a furthest extremum maximum value of a measured quantity and a furthest extremum minimum value of the measured quantity, a means for receiving a selection of a zoom factor defining a degree of magnification of the strip chart, and a means for, in response to receiving the selection of the zoom factor, displaying a plurality of values of the measured quantity on the strip chart, wherein the strip chart is automatically rescaled such that the strip chart is bounded on opposing sides by respective first and second values, the first value comprises one of the furthest extremum maximum value or the furthest extremum minimum value, and the second value is automatically scaled based on the first value and the zoom factor so that the strip chart has a degree of magnification commensurate with the zoom factor and the other one of the furthest extremum maximum value or the furthest extremum minimum value is not displayed on the strip chart.

According to yet another embodiment, a method for displaying a strip chart on an electronic display comprises receiving a selection to display a zoomed range of a measured quantity, receiving a selection of a sample number rate, recording over a period of time a furthest extremum value of the measured quantity at the sample number rate, and displaying, via the electronic display, a plurality of values of the measured quantity on the strip chart, wherein the furthest extremum value is used to automatically rescale the strip chart, providing for at least one bound of the zoomed range.

According to still another embodiment, a system for displaying a plurality of values of the measured quantity on a strip chart is provided. The system comprises a means for receiving a selection to display a zoomed range of a measured quantity and receiving a selection of a sample number rate, a means for recording over a period of time a furthest extremum value of the measured quantity at the sample number rate, and a means for displaying a plurality of values of the measured quantity on the strip chart, wherein the furthest extremum value is used to automatically rescale the strip chart, providing for at least one bound of the zoomed range.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are therefore not to be considered to limit the scope of the disclosure, the embodiments will be described and explained with specificity and detail in reference to the accompanying drawings, herein described.

DETAILED DESCRIPTION

The embodiments of this disclosure will be best understood by reference to the drawings, wherein like parts are designated by like numerals throughout. It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the invention, as claimed, but is merely representative of various embodiments. While the various aspects of the embodiments are presented in drawings, the drawings are not necessarily drawn to scale unless specifically indicated. In addition, the steps of a method do not necessarily need to be executed in any specific order or even sequentially, unless otherwise specified.

As one skilled in the art will appreciate, certain embodiments may be capable of achieving certain advantages over the known prior art, including some or all of the following: (1) zooming in and automatic centering of a measured quantity of interest in a bar graph, thus providing for better resolution of peak values; (2) tracking historical peak values of measured quantities on an auto-scaling chart without need of auxiliary processing, thus providing instant and accurate resolution of a furthest extremum value in a time period; and (3) the ability to track statistical, averaged values of the minimum and maximum peak values of a measured quantity at a user-defined sample number rate over a time period. These and other advantages of various embodiments will be apparent upon reading the following.

Figure 1A:
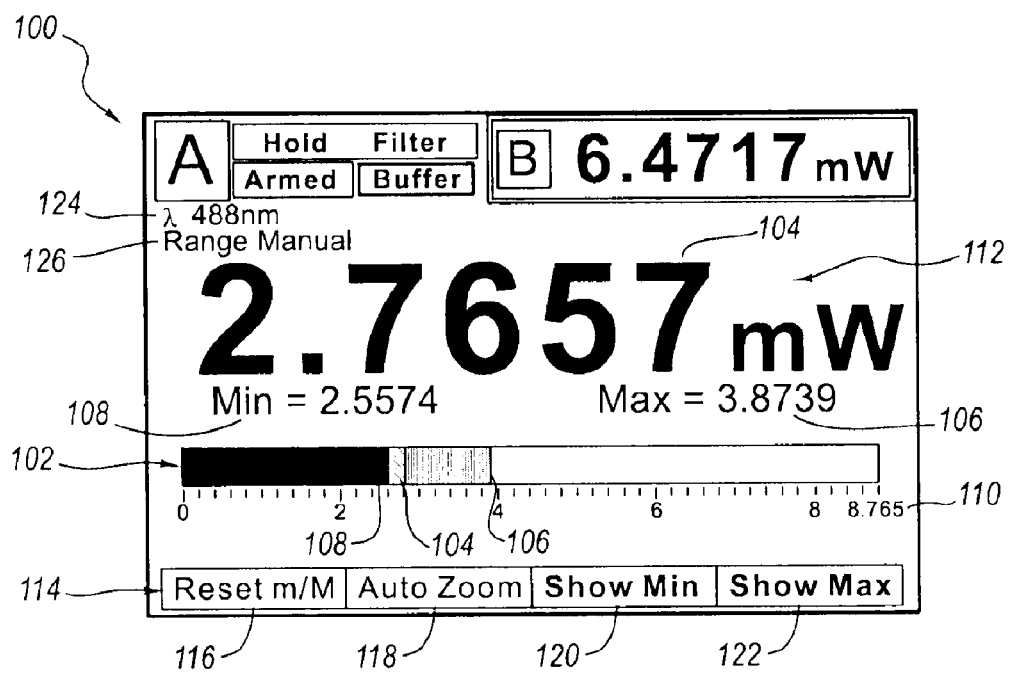
FIGS. 1A and 1B are embodiments of a graphical display with a bar graph scale showing maximum, minimum, and current values.
Figure 1B:
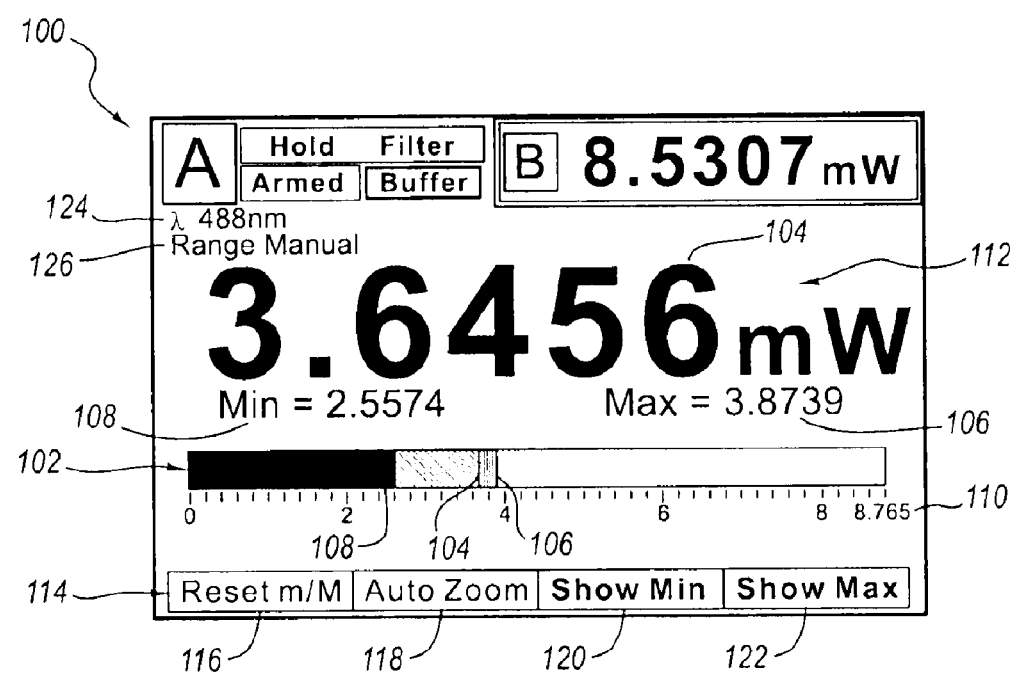

FIGS. 1A and 1B are embodiments of a graphical display 100 that may be used on any device or instrument, such as a meter, designed to measure and indicate a quantity, which may include among others, power, voltage, current, resistance, sound energy and frequency, as well as light energy and power such as that which can be measured by an optical meter. The embodiment of the bar graph 102 displayed in both FIGS. 1A and 1B includes the current measured value 104 as well as the maximum 106 and minimum 108 values, or peak values, that were once obtained during a current period of measurement. The bar graph 102 may include a scale 110 reflecting a relatively precise indication of the values 104, 106, and 108. These values may be more accurately represented, to several decimal points or more, through a digital display 112. The digital display 112 may include the current measured value 104, the maximum value 106, and the minimum value 108. Thus, the bar graph 102 allows simultaneous display of historical peak values 106 and 108, and the current measurement 104.

Contrasting FIG. 1A with FIG. 1B, it is notable that FIG. 1B has a higher current value 104, which if were to extend beyond the maximum peak value 106, it would set a new maximum peak value 106. The differences between the current 104, maximum 106, and minimum 108 values may be discerned with differing colors or shades of a color or differing patterns.

A user may interact with the graphical display 100 to varying degrees, depending on the application, and a status bar 114 displays what feature may be selected at any given time. The status bar 114 may include a reset 116 of the scale of a meter or other instrument for subsequent tests. The auto-zoom feature 118 is selectable as well, which will be discussed with reference to FIGS. 2A through 3B. The "show min" 120 and "show max" 122 indicators allow a user to view both maximum 106 and minimum 108 values at once, or to view only one of either the two maximum 106 or minimum 108 values on the bar graph 102. Thus, displayed in FIGS. 1A, 1B, 3A, and 3B are both the maximum 106 and minimum 108 measured values. In contrast, FIG. 2A displays only the maximum value 106 while FIG. 2B shows only the minimum value 108.

The display of the wavelength 124 of a measured signal may also be included, as may an indicator 126 of the manner with which the measurement range is determined. A measuring device that measures, for instance, optical or electrical power may do so in a series of decade ranges. The user can switch manually between ranges or the user could let the instrument switch automatically based on the actual optical or electrical power read. The indicator 126 thus refers to the choice of auto or manual ranging in measurement, not to the manner in which measured and peak values are displayed.

As the difference between a peak value and the current measured value 104 may be very small to miniscule, especially on the larger scale 110 of a metering device, it may be difficult to obtain the desired resolution on a peak value in comparison to a current value 104. While the numerical display can have any number of significant digits to accommodate the desired resolution, a bar graph 102 is limited by the number of pixels available to the graphical display. In most practical cases, one pixel barely represents a fraction of a percent. Thus, it may be useful to be able to zoom in more closely on a scaled display 102, thus magnifying that scale to be able to see, in real-time, the on-going variations between the peak values and the current value 104. In some signal sources that are monitored, these variations are labeled as "noise," and may have significant interest to an observer. In some cases, the overall peak value, whether the maximum 106 or the minimum 108, needs to be determined.

Figure 2A:
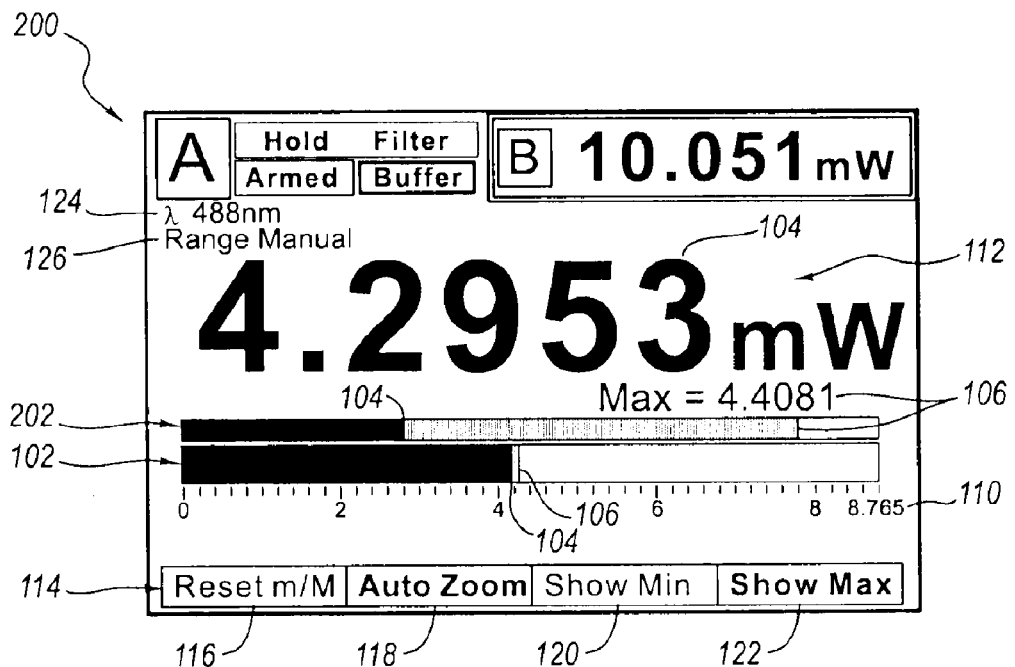
FIGS. 2A and 2B are embodiments of a graphical display with a dual bar graph scale, showing auto-ranging and self-centering on the maximum or minimum values, and the current measured value.
Figure 2B:
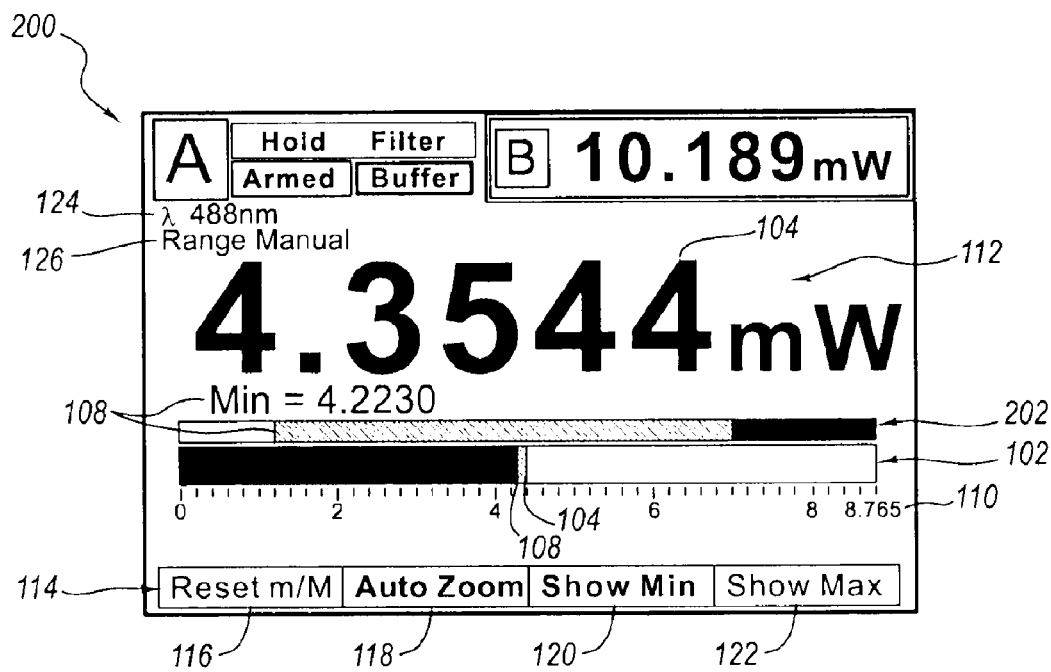

FIGS. 2A and 2B are embodiments of a graphical display 200 now using an additional bar graph 202 that may be used to show the zoomed version of the bar graph 102, centered generally about both the current value 104 and a peak value 106 or 108, or a point therebetween. A simple zoom bar graph works to a point, but the higher the zoom factor, the quicker the bar of the graph reaches the maximum value it can display and "saturates." An automatic self-centering algorithm may be implemented to avoid saturation. When the zoomed value reaches the zoom bar's maximum value on the zoomed scale, new limits are calculated and the "zoom window" is automatically shifted to bring the current value 104 generally centered in the display.

Thus, an auto-ranging and self-centering zoomed bar graph 202 may simultaneously display the current value 104 and the maximum value 106 (FIG. 2A) to better display the zoomed-in difference between the two, while a bar graph 102 retains a zoomed-out picture of both. The range of the zoomed bar graph 202 may be automatically adjusted to ensure that both a current value 104 and a peak maximum 106 value are still viewable, despite a growing distance due to variability in the measured source. This may be accomplished, for instance, by self-centering the two values 104 and 106 whenever the graph 102 is updated.

If the distance between the current value 104 and a peak value 106 or 108 grows so much that to display them simultaneously would require too much zooming out, the auto-ranging aspect of the zoom bar graph 202 may let the current value 104 or the peak value 106 or 108 drop off one end of the bar graph 202 to retain a zoomed focus on the value of interest. The value of interest may be user selectable, and may include the current value 104 or one of a maximum 106 or minimum 108 peak value. As in FIGS. 1A and 1B, a digital display 112 may display similar data more accurately, showing in FIG. 2A, for instance, the current measured value 104 and the maximum peak value 106 numerically.

Additionally, the above example works the same for a minimum peak value 108 (FIG. 2B), for instance, when a user is trying to see the dips in measured quantities with particular interest on the peak minimum value 108. The auto-ranging, self-centering zoom bar graph 202 may be used to simultaneously display the current value 104 and the minimum value 108 within a zoomed-in range, while a bar graph 102 retains a zoomed-out picture of the two.

Figure 3A:
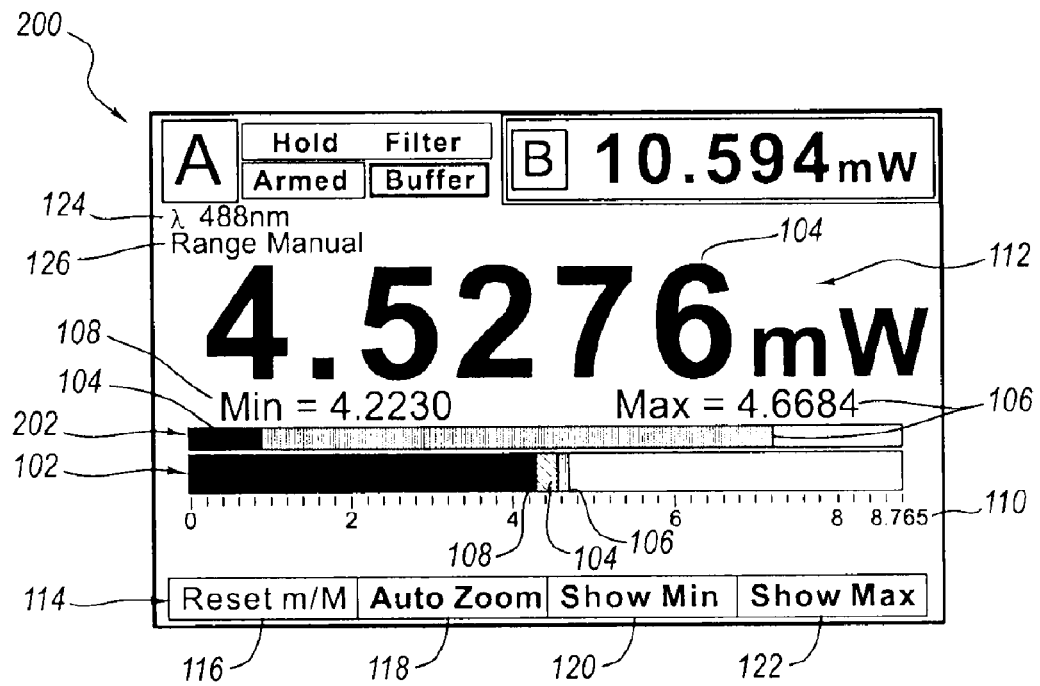
FIGS. 3A and 3B are alternative embodiments of the graphical displays shown in FIGS. 2A and 2B.
Figure 3B:
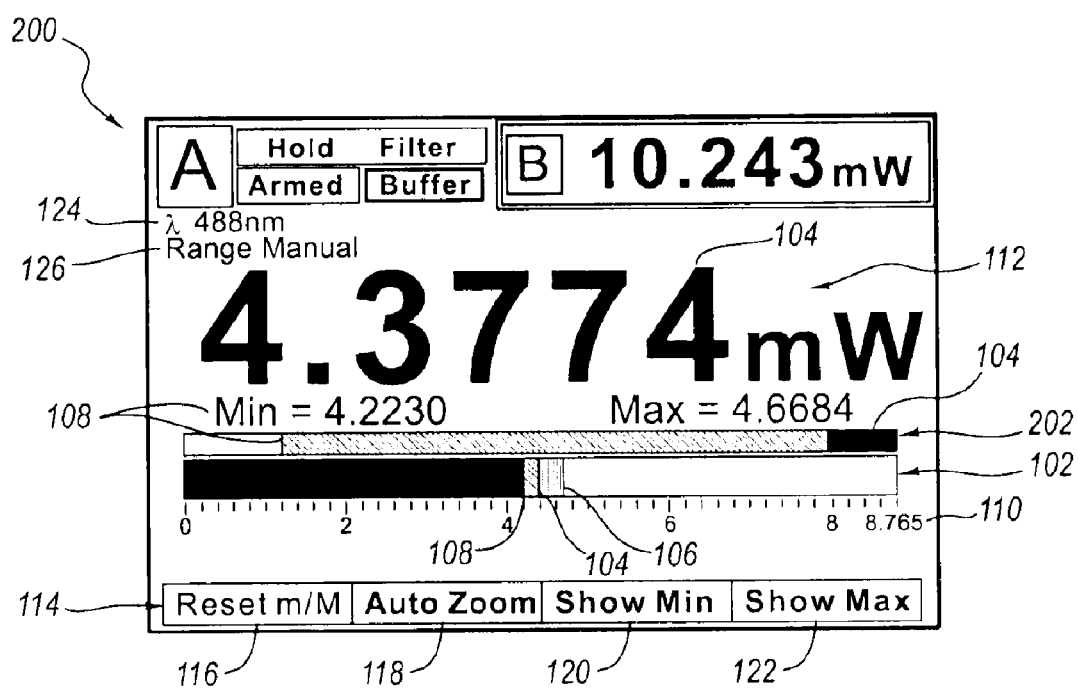

FIGS. 3A and 3B are similar embodiments of a graphical display 200 as in FIGS. 2A and 2B, but with another option available to a user: that of choosing to see both the maximum value 106 and the minimum value 108 on bar graph 102. That these options are chosen may be highlighted by indicators "show min" 120 and "show max" 122 of the status bar 114. With such an option, the main bar graph 102 now displays not only the current measured quantity 104, but also the maximum 106 and minimum 108 values, as discussed with reference to FIGS. 1A and 1B. The auto-ranging, self-centering zoom bar graph 202 displays, respectively for FIGS. 3A and 3B, the zoomed versions of the maximum 106 and minimum 108 values, each together with the current value 104, centered generally within the zoom ranged.

An instrument or device with high throughput can take a large amount of data which cannot be viewed in its entirety on a typical display. The user would have to save the data to a large memory for future download or transfer the data at a high rate to a host computer. In either case, the user would have to post-process the data, which requires additional work and cannot be done in real-time with the measurement. As a solution, a user interface may be developed to present the current measurement and the statistical or historical data in real-time in an easy-to-read, graphical format on the same instrument display panel, as shown in FIGS. 4A through 9B. This obviates the need for separate computing devices.

Figure 4A:
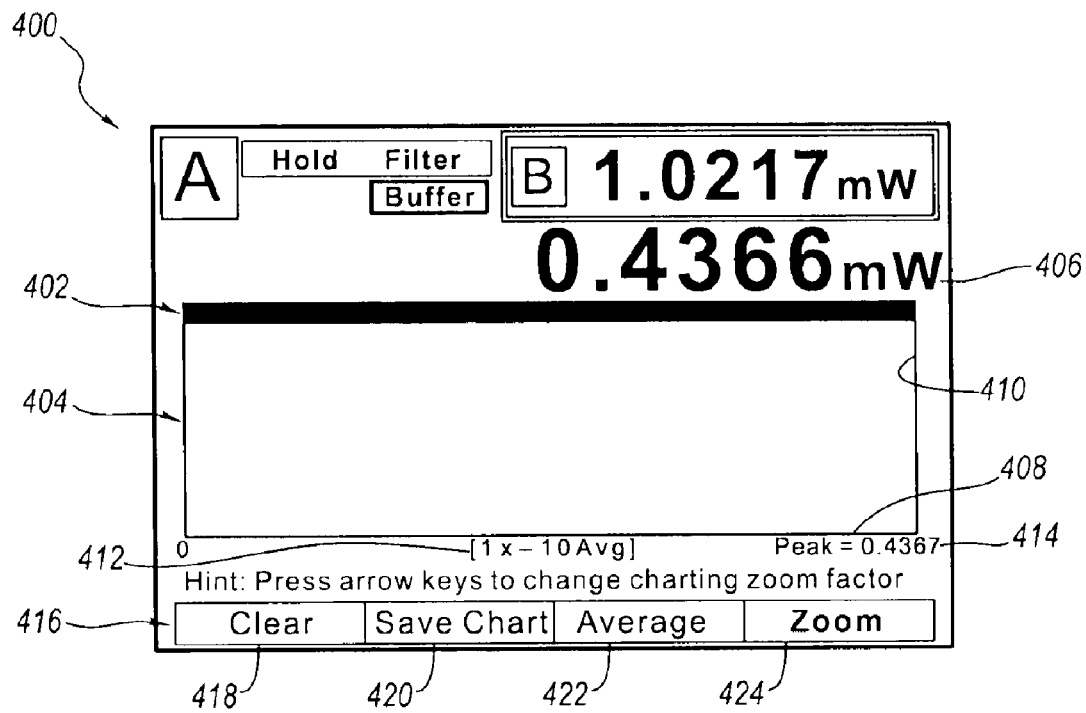
FIG. 4A is an embodiment of a basic layout of a current value measurement bar graph juxtaposed with an auto-scaling strip chart.
Figure 4B:
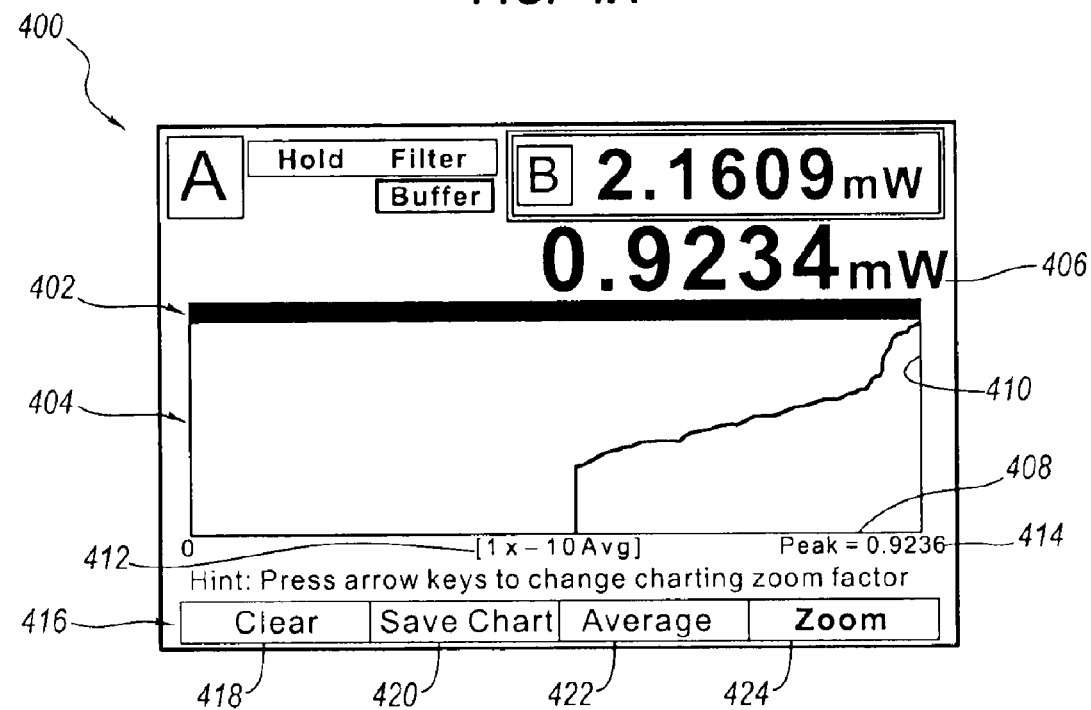
FIG. 4B includes the bar graph and chart of FIG. 4A showing historical display of peak values.
Figure 5A:
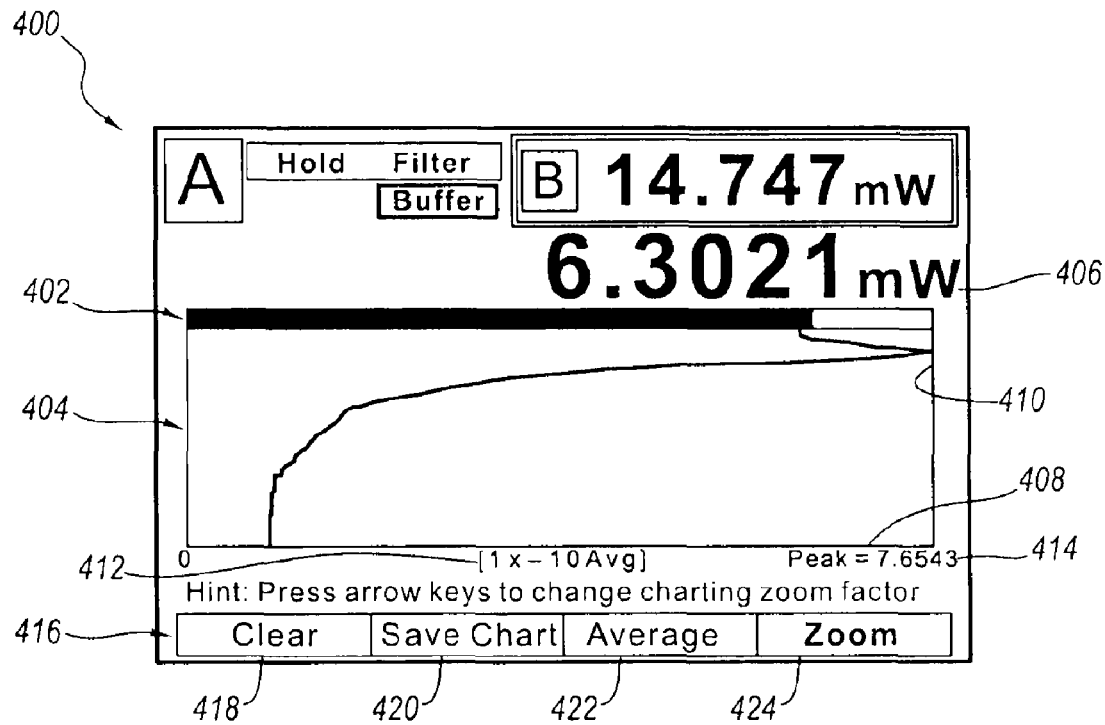
FIGS. 5A and 5B are embodiments of the bar graph and chart of FIG. 4A showing the chart's auto-scaling function.
Figure 5B:
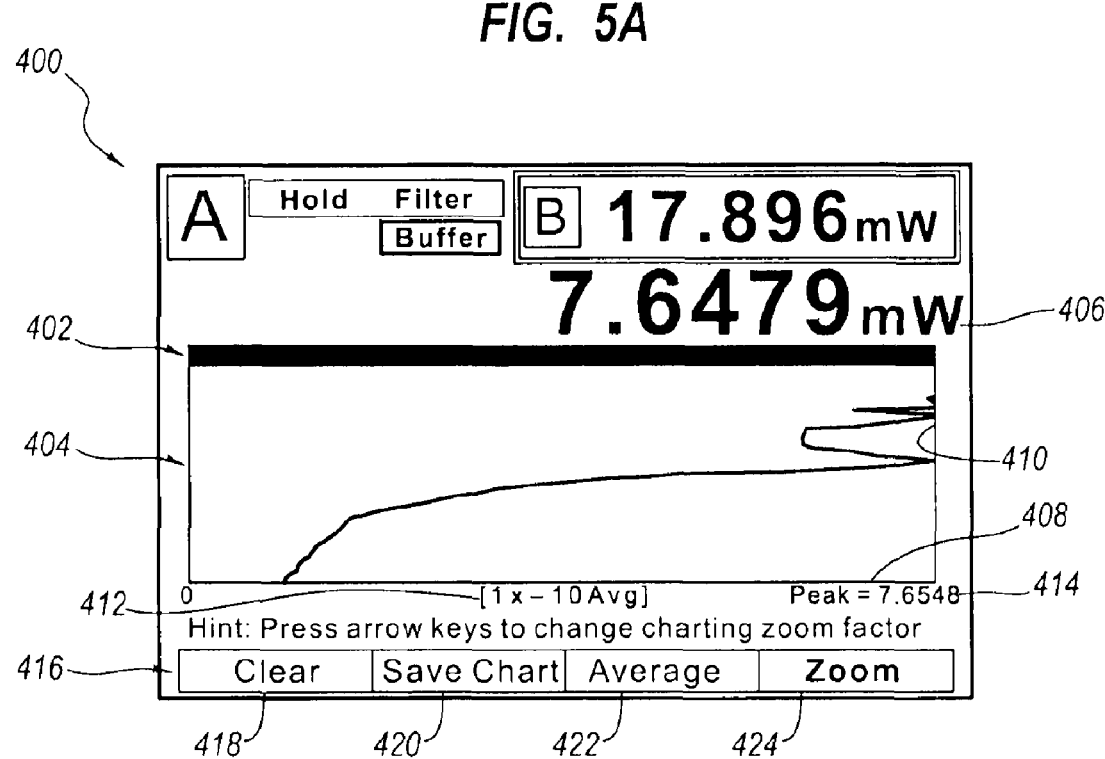

FIG. 4A displays an embodiment of a graphical display 400, showing a basic layout of a current-value-measurement bar graph 402, juxtaposed with an auto-scaling strip chart 404. A digital scale 406 shows the real-time numerical value of the current value 104. Also referring to FIG. 4B, along the right-to-left axis 408 is an indication of magnitude of a measured quantity, while the up-to-down axis 410 is an indication of time, with the most recent measurements lying closest to the top portion of the strip chart 404, adjacent the bar graph 402. The total time represented on the strip chart 404 at a given time may be referred to as a "time period." Along the bottom middle of the strip chart is displayed a zoom factor 412, which dictates the level of magnification of the chart 404 display. At the bottom right is an updated peak value 414, a "furthest extremum value," which is also the chart scale maximum value. This means that despite zooming in on a particular area of historical measurement data, the peak value 414 is continually displayed and automatically used as a full scale of the strip chart 404.

As with FIGS. 1A to 3B, a status bar 416 may be available to show indication of a user's selected feature. Such features may include clearing 418 the chart data, for instance, to begin a new measurement period. The strip chart 404 keeps track of the furthest extremum value recorded since the last clear 418 function selection. The furthest extremum value may be the maximum peak value 414, and the chart 404 is dynamically scaled to this value. This real-time scaling to update the zoom according to a new peak value, is called "auto-scaling," the results of which are observable in FIGS. 5A and 5B. As time marches on, the auto-scaling results in the maximum peak value 414 that always falls along the right edge 410, and the minimum value is resultantly pushed closer to the left edge. This construct, of course, could be flipped where the interest is in a minimum peak value, as will be later discussed.

A common application of taking measurement data of a quantity is called "peaking," in which the user needs to make some adjustments and find the maximum (or minimum) source intensity. Using this type of auto-scaling chart 404, the user does not have to spot the peak value and memorize it as a target. The visual target is always on the right side (or left side for minimum peaks) of bar graph 402 and strip chart 404.

Another feature of the status bar 416 may include saving the chart 420 to some output format available electronically or in print, for later analysis. An average 422 option is selectable to display the average of maximum 106 and minimum 108 values of measured quantities over time, thus giving statistical average information for a measurement period, which is discussed in more depth with reference to FIGS. 8A through 9B. Finally, the zoom 424 feature is selectable to zoom in the strip chart 404 to show more detail of the variations of the historical measured peak quantities.

FIGS. 6A through 7B are embodiments of the bar graph 402 and strip chart 404 of FIG. 4A, showing the chart's zooming function. As the user visually finds the maximum value, the accuracy of the adjustments is determined in large part by the graphical resolution of the bar graph and the strip chart. To improve this resolution, a zoom function may be implemented in which the maximum peak value 414, a "furthest extremum value," is automatically kept as the scale maximum along the right side of the bar graph 402 and strip chart 404. A scaled minimum value 426, displayed on the bottom left side is scaled up to achieve the desired zooming factor 412, thus a minimum value 426 would no longer be the extremum minimum value on strip chart 404.

In the alternative, the roles of the maximum 414 and minimum 426 peak values may switch places when interest is in tracking the furthest extremum minimum value 426 instead. In this case, the maximum peak value 414 displayed on a strip chart 404 may not be the extremum maximum value, but the minimum peak value 426 would always be the extremum minimum peak value, as could be displayed on the left side of the strip chart 404.

Figure 6A:
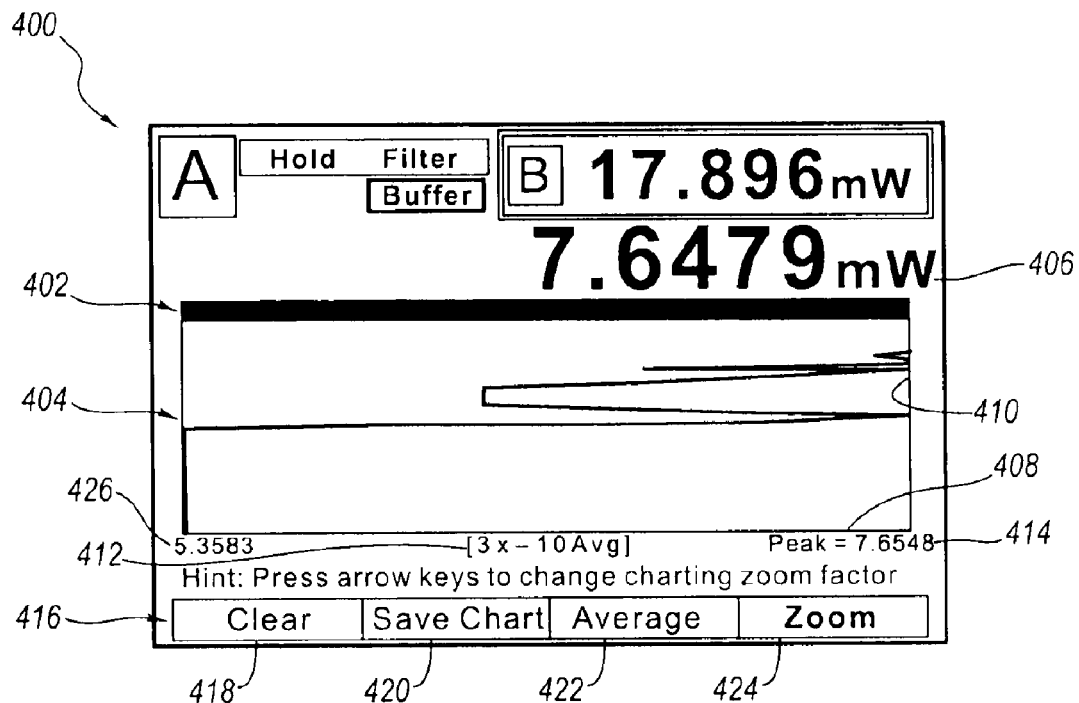
FIGS. 6A, 6B, 7A, and 7B are embodiments of the bar graph and chart of FIG. 4A showing the chart's zooming function.
Figure 6B:
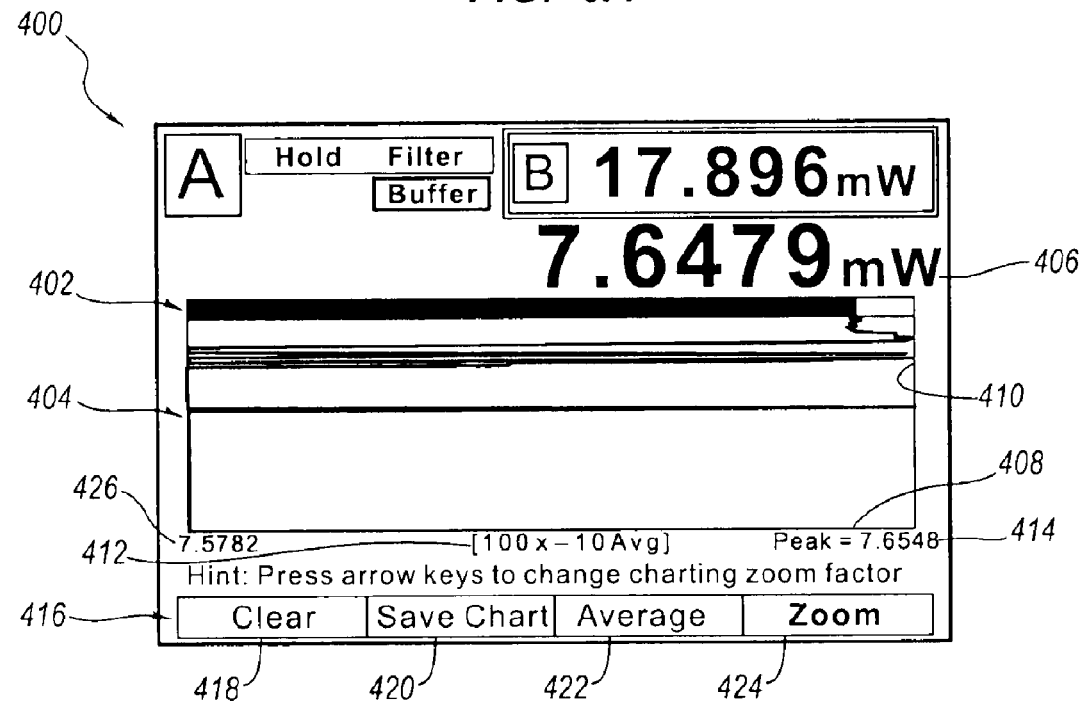

For example, the effect of zooming is evident by a comparison of FIGS. 6A and 6B. In FIG. 6B, the zooming factor 412 has increased by a factor of around 33 (from 3 to 100), forcing the scale minimum value 426 to 7.5782 from a previous 5.3583. While this zooming truncates the left side of the chart, the magnification becomes adequate for the user to fine tune the adjustment and find the true furthest extremum value 414. If a user's interest is in finding the furthest extremum minimum value 426, the chart may be flipped horizontally so that the right side of the chart 404 is truncated as the zooming factor 412 increases, and the left side of the chart stays scaled to the minimum peak value 426.

Figure 7A:
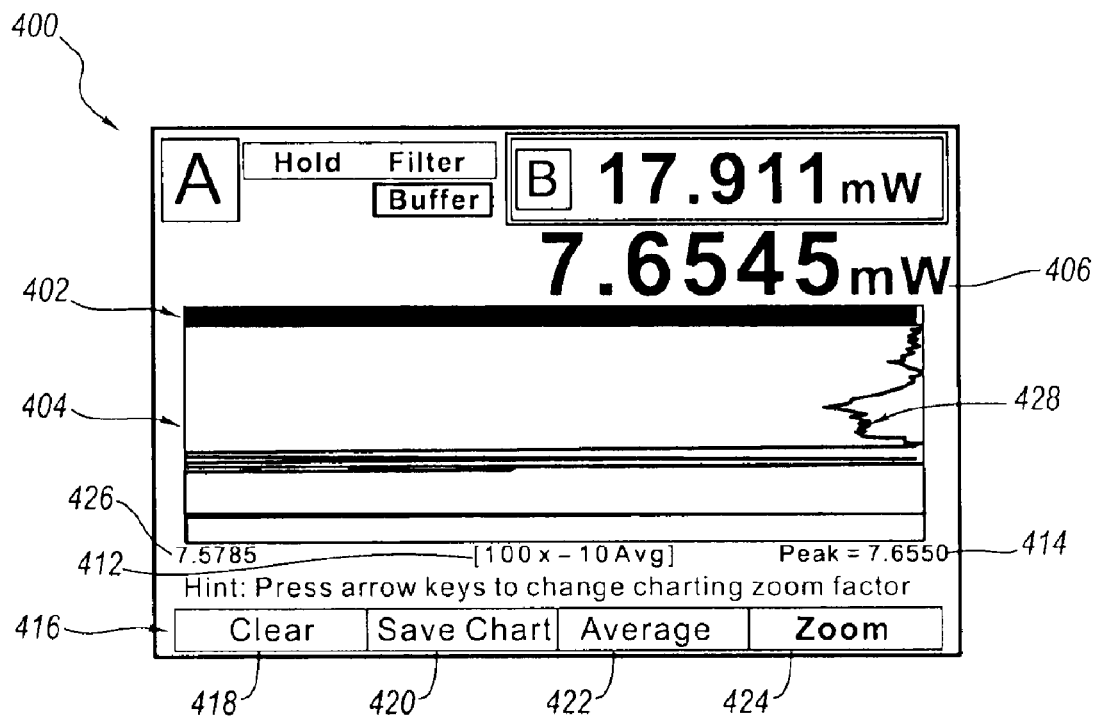
Figure 7B:
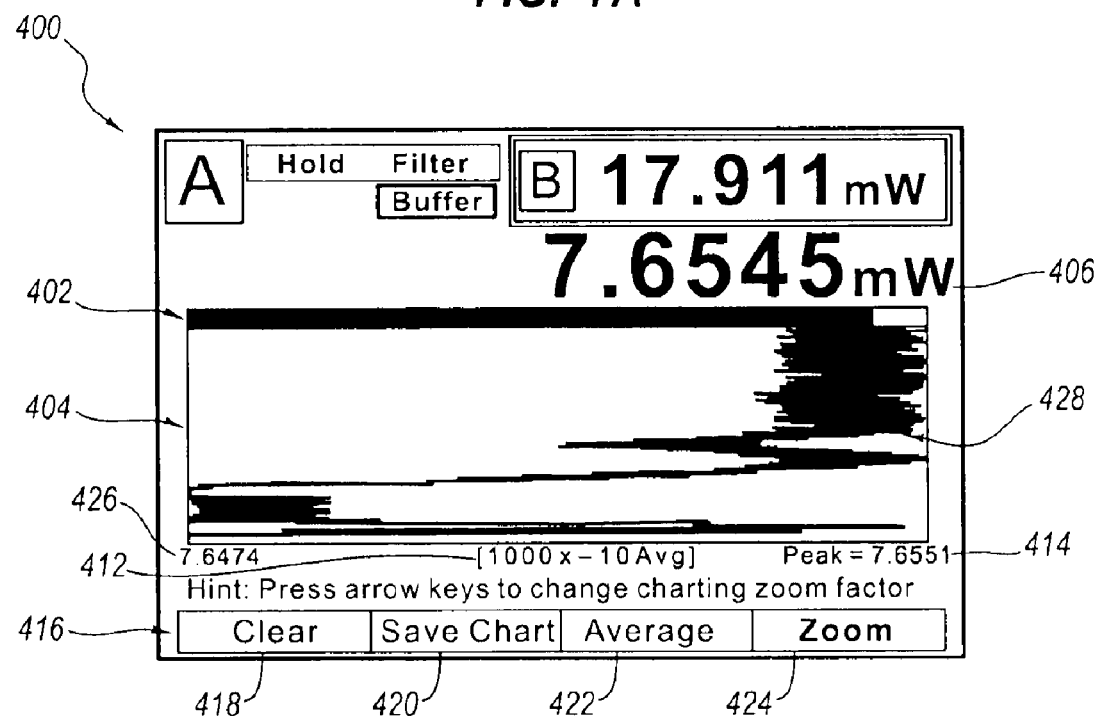

In FIGS. 7A and 7B, increasing the zooming factor 412 further achieves higher levels of magnification, which may reveal details hidden on standard graphical strip charts. Note the variations in dark portions 428 at the right-most section of the graphical data, displaying the noise 428 at different periods of time and to different degrees. For analysis, this sort of graphical data would be resource-consuming to reconstruct on another computer or by post-processing.

One of skill in the art will appreciate that the bar graph 402 and strip chart 404 may be configured, along with a user-selectable option, to position the peak minimum value along the right side and the peak maximum value along the left side of the bar graph 402 and strip chart 404 without moving beyond the scope and spirit of this disclosure. Likewise, one of skill in the art would appreciate using both a maximum peak value 414 and a minimum peak value 426 both as "furthest extremum values" so as to bind both sides of the strip chart 404, in order to track both of them. Although perhaps sacrificing resolution on both the maximum and minimum peaks of the measured values over time, such an option may be viable where the measured source has little variability and an acceptable zoom factor 412 may again be selected by a user.

In FIGS. 8A through 9B are embodiments 800 of the bar graph 402 and strip chart 404 of FIG. 4A showing the chart used as a statistical strip chart 802. As discussed previously, when a user selects the option to average the maximum 414 and minimum 426 peak values, an indication is reflected as "average" 422 on the status display 416. The "average" 422 option allows a user to view statistical data of the maximum 414 and minimum 426 peak values of a user-selected number of samples 804. That is, the user-selected number of samples 804 determines both the statistics window and the rate at which the strip chart 802 is being updated. Each horizontal line shown in the strip chart 802 in FIGS. 8A through 9B represents one statistical set of data, or an average maximum value and an average minimum value for the sampled period.

Figure 8A:
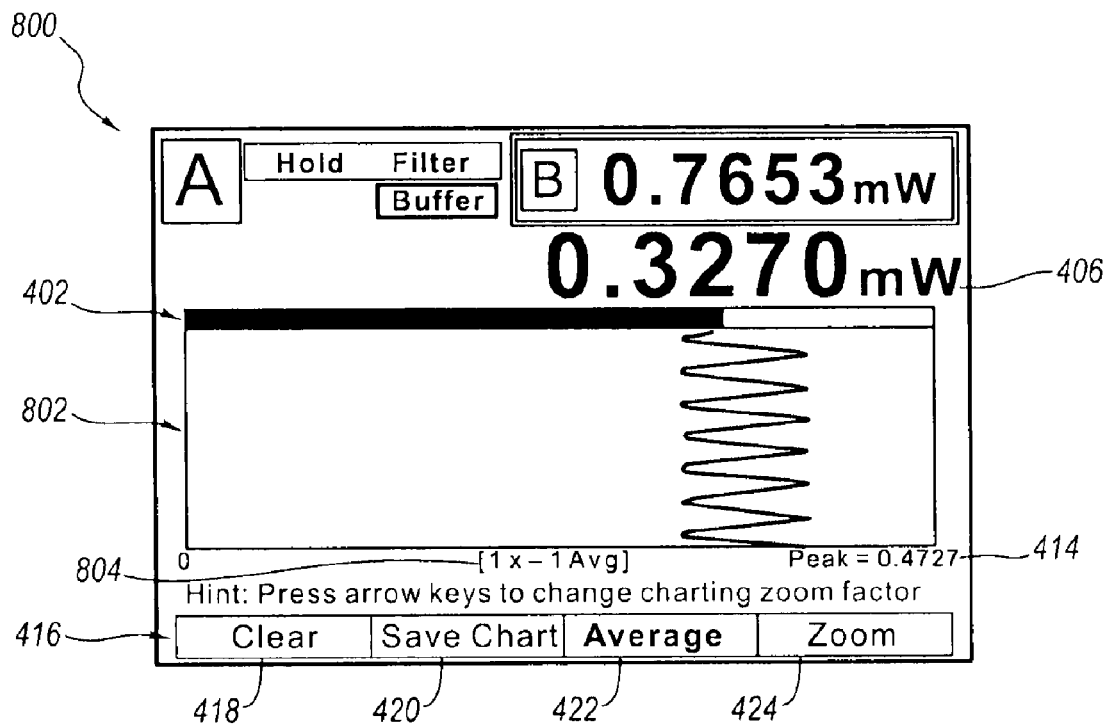
FIGS. 8A, 8B, 9A, and 9B are embodiments of the bar graph and chart of FIG. 4A showing the chart used as a statistical strip chart.
Figure 8B:
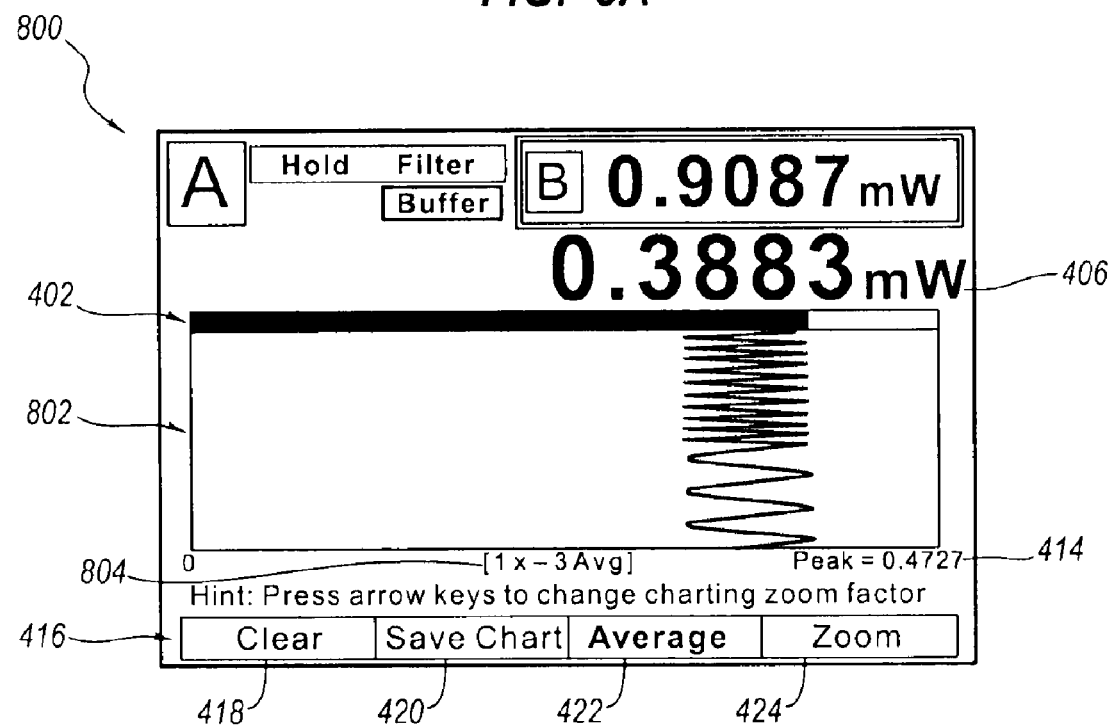
Figures 9A, 9B:
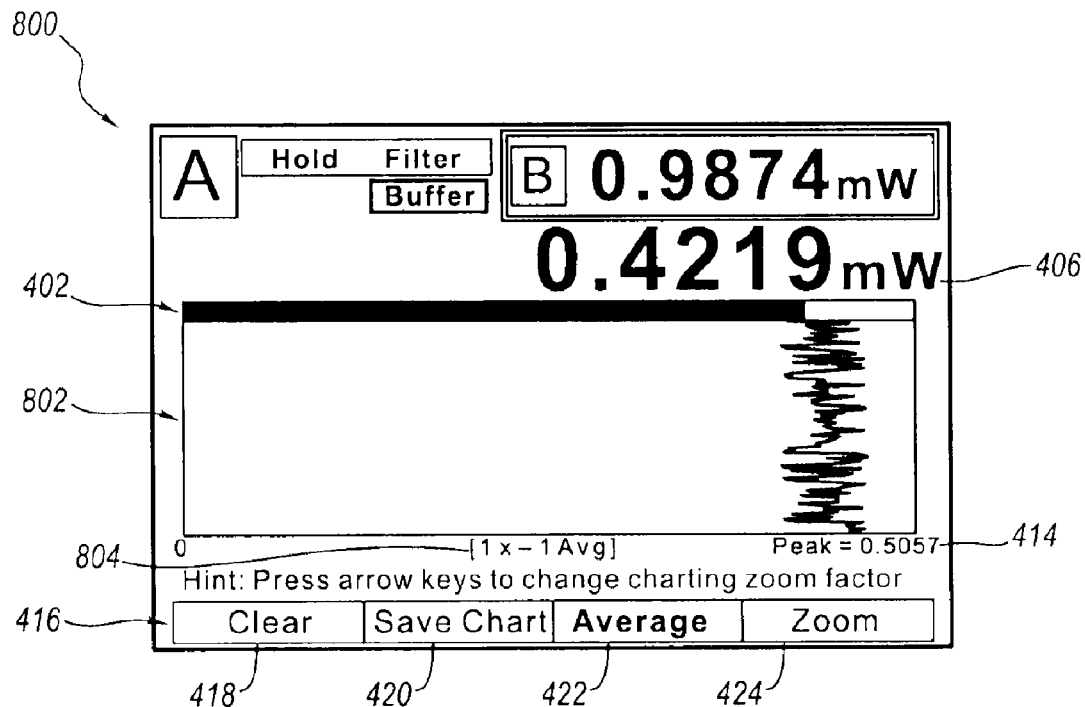

If the sample number 804 is set to one, the chart 802 is updated at the maximum rate of measurement, and no effective statistics are presented, as shown in FIGS. 8A and 9A. When the sample number 804 is increased, however, the strip chart 802 will show the minimum and maximum of each data set, which sets increase with the sample number 804, as shown in FIGS. 8B and 9B. The values may be graphically represented by a single line per data set. The line may have two different colors, one for the minimum value and one for the maximum value. This statistics feature may be especially useful in observing short and long-term data variations. An example would include the instance when the data contains a significant amount of noise, as seen in FIG. 9B.

In addition, strip chart 802 may be configured to display in chart form the mean, standard deviation, frequency, and ranges between minimum 106 and maximum 108 peak values. Thus, strip chart 802 may be used to display a wide range of statistical data, and the "averaging" example as shown in FIGS. 8A through 9B should be considered exemplary only. Such additional statistical information may likewise be calculated in data sets with which to be displayed over a time period along the chart 802. The data sets may be calculated through the use of varying algorithms appropriate for the type of statistical data sought, the algorithm also dictating the type of scale used to display the data sets. These algorithms may be developed specifically to match up with a measured quantity, or may be adapted from those already known in the art.

One skilled in the art will appreciate that the arrangement of elements on the display of a measuring device can be varied to suit one's tastes, aesthetic sense, and ergonomic usability, among other factors. For example, the bar graphs and strip charts of FIGS. 2-9 could be oriented vertically in lieu of horizontally, and fall within the spirit and scope of the disclosure.

Figure 10:
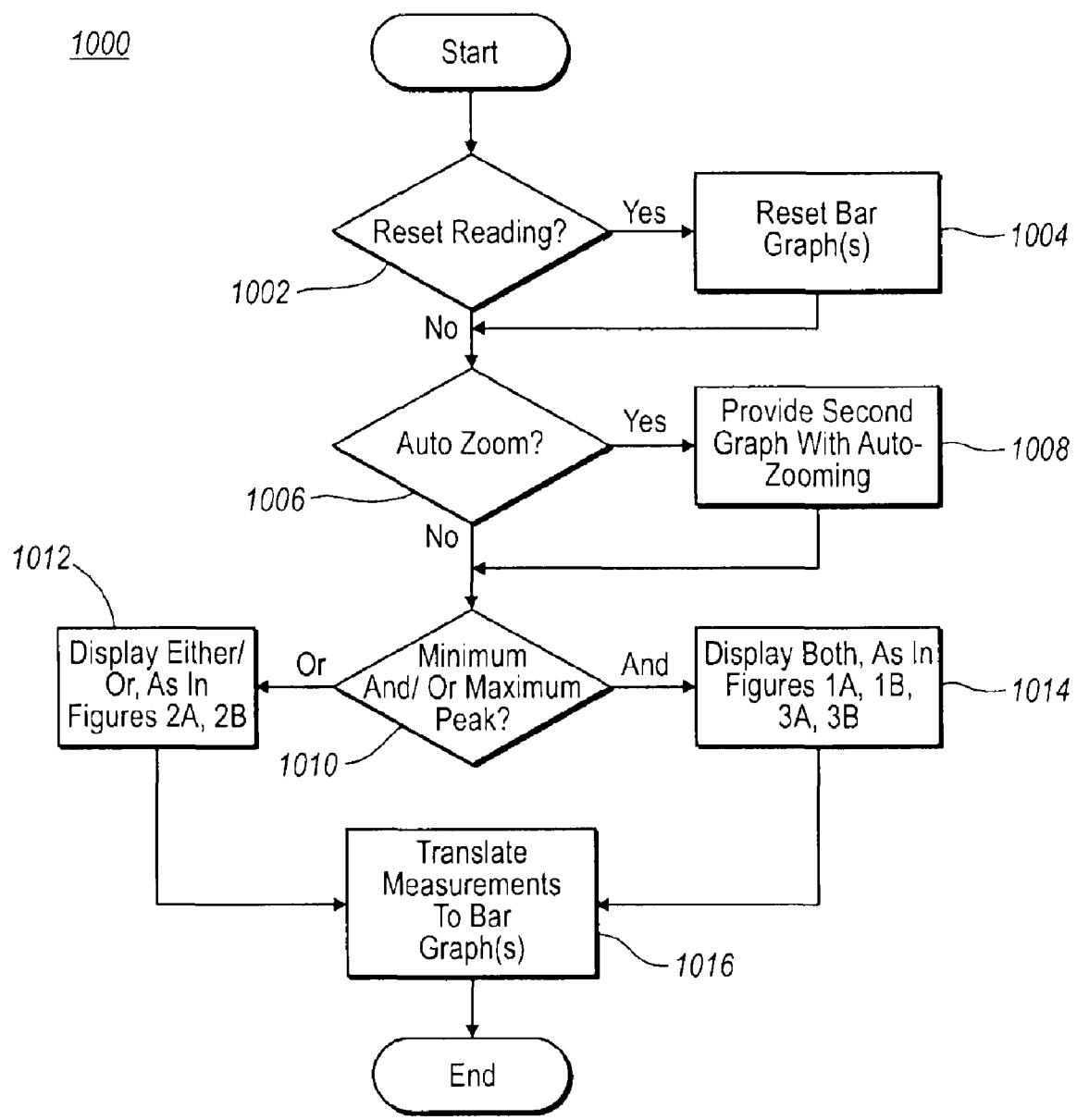
FIG. 10 is a flow chart of an embodiment of a method for providing decisional options to a user of the graphical display of FIGS. 1A, 1B, 3A, and 3B.

FIG. 10 is a flow chart of an embodiment of a method 1000 for providing decisional options to a user of graphical displays 100 and 200 of FIGS. 1A, 1B, 3A, and 3B. A user may select 1002 to reset the reading of a measuring device, in which case the device will reset 1004 the bar graph(s) 102 and 202 currently being displayed. To "reset" typically means to erase the data being displayed from the bar graph in order to be ready to display another period of measurement of a measured quantity. A user may select 1006 to auto-zoom the bar-graph display 102 or 202, in which case the device provides 1008 auto-zooming with a second bar-graph, as discussed with reference to FIGS. 1A through 3B.

A user may also select 1010 whether the user wants to display a maximum peak 106 and/or a minimum peak 108 value of a measured quantity. If only one is selected, then displayed 1012 is either the maximum 106 or the minimum 108 peak value on the bar graph 102, as in FIGS. 2A and 2B. If both are selected, then displayed 1014 on the bar graph 102 are both maximum 106 and minimum 108 values, as in FIGS. 1A, 1B, 3A, and 3B. As a final step, the device translates 1016 whatever measurement values are currently read to the bar graph scale, whether to the bar graph 102 or to the zoomed range of the bar graph 202, for proper display.

Figure 11:
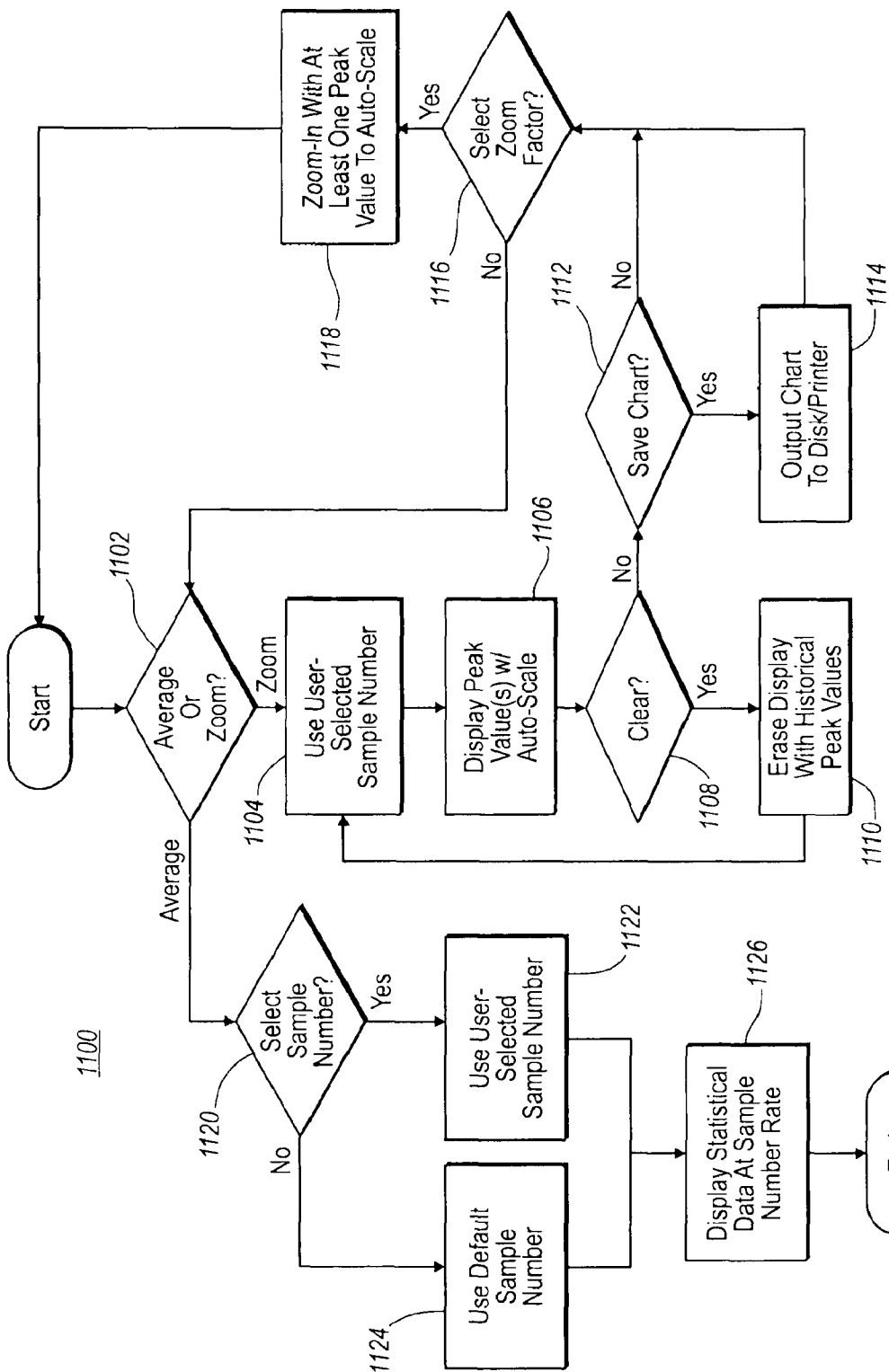
FIG. 11 is a flow chart of an embodiment of a method for providing decisional options to a user of the graphical display of FIGS. 4A, 4B, 5A, 5B, 6A, 6B, 7A, 7B, 8A, 8B, 9A, and 9B.

FIG. 11 is a flow chart of an embodiment of a method 1100 for providing decisional options to a user of the graphical displays 400 and 800 of FIGS. 4A through 9B. A user may select 1102 whether to average the incoming data to provide a statistical chart 800, or whether to zoom into the historical data to see variations in the strip chart 404 peak values. If the user selects to zoom the chart 404, then the device records 1104 the furthest extremum (or peak) value or values, which may be used to auto-scale the chart. The device displays 1106 the measurement data with at least one peak value, such as the maximum peak shown in FIGS. 4B to 7B, which may be automatically used as the full chart 400 scale. Note that there may be two furthest extremum values, one a minimum and one a maximum, and the possibility of a zoomed range being between the two, as previously discussed.

If a user selects to clear 1108 the measurement data from the display, then the device erases 1110 the display with historical peak values and re-enters the method 1100 at step 1104, recording 1104 the furthest extremum values and displaying 1106 peak value(s) in an auto-scaling fashion. If a user selects to save 1112 the current chart 400, then the chart 404 is outputted 1114 to a disk, printer, or other software or hardware recordable medium. A user may also select 1116 a zoom factor 412 with which to adjust the magnification of the graphical data on strip chart 404. If a user so selects 1116, then the chart 400 is zoomed in 1118, bounded with at least one peak as the device auto-scales the chart 400 from either the right or left extremum. This will allow magnification of variations of at least one peak value (i.e. a maximum) while the other peak value (i.e., a minimum) falls off the scale at sufficiently large zoom factors 412. If a user does not select 1116 a zoom factor 412, the method 1100 cycles through, having the option to select 1102 average or zoom again.

If a user selects 1102 to average instead of to zoom, then incoming peak values are sampled to provide a statistical chart 802 with data points comprising a minimum and maximum value at discrete intervals based on a sample number. Thus, the average minimum and average maximum value for each sampled period is provided. This was also discussed with reference to FIGS. 8A to 9B. A user may select 1120 the sample number 804, in which case the device uses 1122 that sample number 804 to generate the statistical strip chart 802. Otherwise, the device uses 1124 a default sample number. In either case, the device displays 1126 the statistical data at the selected or default sample number rate, until a user either selects 1120 a new sample number, or decides 1102 to select the zooming option.

The methods 1000 and 1100 and other methods for generating the displays illustrated and described herein can exist in a variety of forms, both active and inactive. For example, they can exist as one or more software or firmware programs comprised of program instructions in source code, object code, executable code or other formats. Any of the above can be embodied on a computer-readable medium, which include storage devices and signals, in compressed or uncompressed form. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer-readable signals, whether modulated using a carrier or not, are signals that a computer system hosting or running a computer program can be configured to access, including signals downloaded through the Internet or other networks. Concrete examples of the foregoing include distribution of software on a CD ROM or via Internet download. In a sense, the Internet itself, as an abstract entity, is a computer-readable medium. The same is true of computer networks in general.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

The invention claimed is:

1. A method for displaying a strip chart on an electronic display, the method comprising:
   recording over a period of time a furthest extremum maximum value of a measured quantity and a furthest extremum minimum value of the measured quantity;
   receiving a selection of a zoom factor defining a degree of magnification of the strip chart; and
   in response to receiving the selection of the zoom factor, displaying, via the electronic display, a plurality of values of the measured quantity on the strip chart, wherein the strip chart is automatically rescaled such that the strip chart is bounded on opposing sides by respective first and second values, the first value comprises one of the furthest extremum maximum value or the furthest extremum minimum value, and the second value is automatically scaled based on the first value and the zoom factor so that the strip chart has a degree of magnification commensurate with the zoom factor and the other one of the furthest extremum maximum value or the furthest extremum minimum value is not displayed on the strip chart.

2. A method according to claim 1, wherein the furthest extremum maximum value is the largest maximum peak value in the period of time and the furthest extremum minimum value is the smallest minimum peak value in the period of time.

3. A method according to claim 1, wherein the plurality of values include the maximums and the minimums of the measured quantity in the period of time.

4. A method according to claim 1, further comprising:
   receiving a selection to clear the strip chart; and
   in response to receiving the selection to clear the strip chart:
      erasing the display of all of the plurality of values of the measured quantity;
      recording over a different period of time a furthest extremum maximum value of a measured quantity and a furthest extremum minimum value of the measured quantity; and
      repeating the displaying step using the furthest extremum maximum and minimum values of a measured quantity recorded over the different period of time.

5. A method according to claim 1, further comprising:
   receiving a selection to save the strip chart; and
   in response to receiving the selection to save the strip chart, outputting the strip chart to a recordable medium.

6. A method according to claim 1, wherein the measured quantity comprises optical power or optical energy.

7. A method according to claim 1, further comprising:
   presenting, via the electronic display, a menu of selectable-options including an option to select the zoom factor defining the degree of magnification of the strip chart.

8. A method according to claim 1, further comprising:
   receiving a selection of a sample number rate, wherein the furthest extremum maximum and minimum values of the measured quantity are recorded over the period of time at the selected sample number rate.

9. A method according to claim 1, further comprising:
   displaying on the electronic display concurrently with the strip chart a bar graph, wherein the bar graph is configured to display a current value of the measured quantity.

10. A non-transitory computer-readable medium for use with a measuring device that records over a period of time furthest extremum maximum and minimum values of a measured quantity, wherein the non-transitory computer-readable medium has instructions stored thereon for displaying a plurality of values of the measured quantity on a strip chart in response to receiving a selection of a zoom factor defining a degree of magnification of the strip chart, the instructions comprising:

instructions for, in response to receiving the selection of the zoom factor, displaying a plurality of values of the measured quantity on the strip chart, wherein the strip chart is automatically rescaled such that the strip chart is bounded on opposing sides by respective first and second values, the first value comprises one of the furthest extremum maximum value or the furthest extremum minimum value, and the second value is automatically scaled based on the first value and the zoom factor so that the strip chart has a degree of magnification commensurate with the zoom factor and the other one of the furthest extremum maximum value or the furthest extremum minimum value is not displayed on the strip chart.

11. A system comprising:

a display configured to display a plurality of values of a measured quantity on a strip chart; and a measuring device in operative association with the display, the measuring device configured to:

record over a period of time a furthest extremum maximum value of the measured quantity and a furthest extremum minimum value of the measured quantity;

receive a selection of a zoom factor defining a degree of magnification of the strip chart; and in response to receiving the selection of the zoom factor, display, via the display, a plurality of values of the measured quantity on the strip chart, wherein the strip chart is automatically scaled to a degree of magnification commensurate with the zoom factor and the strip chart is automatically scaled such that the strip chart is bounded on one side by one of the furthest extremum maximum value or the furthest extremum minimum value and the other one of the furthest extremum maximum value or the furthest extremum minimum value is not displayed on the strip chart.

12. A system according to claim 11, wherein the furthest extremum maximum value is the largest maximum peak value in the period of time and the furthest extremum minimum value is the smallest minimum peak value in the period of time.

13. A system according to claim 11, wherein the plurality of values include the maximums and the minimums of the measured quantity in the period of time.

14. A system according to claim 11, wherein the measuring device is further configured to receive a selection to clear the strip chart and, in response to receiving the selection to clear the strip chart, erase the display of all of the plurality of values of the measured quantity.

15. A system according to claim 11, wherein the measuring device is further configured to receive a selection to save the strip chart and, in response to receiving the selection to save the strip chart, output the strip chart to a recordable medium.

16. A system according to claim 11, wherein the measuring device comprises an optical meter and the measured quantity comprises optical power or optical energy.

17. A system according to claim 11, wherein the measuring device is further configured to receive a selection of a sample number rate and the furthest extremum maximum and minimum values of the measured quantity are recorded over the period of time at the selected sample number rate.

18. A system according to claim 11, wherein the strip chart occupies a fixed portion of the display device and is bound by left and right opposing edges and upper and lower opposing edges, the strip chart includes a horizontal axis representing a magnitude of the measured quantity and a vertical axis representing time and a distance between the upper and lower opposing edges represents the period of time over which the furthest extremum maximum and minimum values of the measured quantity are recorded, and each of the plurality of values of the measured quantity is presented as a data point on the strip chart with a most recent measured quantity being presented along the upper edge, the data points accumulating on the strip chart as time progresses so that a history of values versus time is presented via the strip chart.

19. A system according to claim 11, wherein the measuring device is further configured to display, via the display, a bar graph concurrently with the strip chart, the bar graph configured to display a current value of the measured quantity.

20. A system for displaying a plurality of values of the measured quantity on a strip chart, the system comprising:

a means for recording over a period of time a furthest extremum maximum value of a measured quantity and a furthest extremum minimum value of the measured quantity;

a means for receiving a selection of a zoom factor defining a degree of magnification of the strip chart; and a means for, in response to receiving the selection of the zoom factor, displaying a plurality of values of the measured quantity on the strip chart, wherein the strip chart is automatically rescaled such that the strip chart is bounded on opposing sides by respective first and second values, the first value comprises one of the furthest extremum maximum value or the furthest extremum minimum value, and the second value is automatically scaled based on the first value and the zoom factor so that the strip chart has a degree of magnification commensurate with the zoom factor and the other one of the furthest extremum maximum value or the furthest extremum minimum value is not displayed on the strip chart.

21. A method for displaying a strip chart on an electronic display, the method comprising:

receiving a selection to display a zoomed range of a measured quantity;

receiving a selection of a sample number rate;

recording over a period of time a furthest extremum value of the measured quantity at the sample number rate; and displaying, via the electronic display, a plurality of values of the measured quantity on the strip chart, wherein the furthest extremum value is used to automatically rescale the strip chart, providing for at least one bound of the zoomed range.

22. A method according to claim 21, wherein the furthest extremum value comprises the largest maximum peak value in the period of time or the smallest minimum peak value in the period of time.

23. A method according to claim 21, further comprising:

receiving a selection to clear the strip chart; and in response to receiving the selection to clear the strip chart:

erasing the display of all of the plurality of values of the measured quantity;

recording over a different period of time a furthest extremum value of the measured quantity at the sample number rate; and repeating the displaying step using the furthest extremum value of the measured quantity recorded over the different period of time.

24. A method according to claim 21, further comprising:
receiving a selection of a zoom factor defining a degree of magnification of the strip chart; and
in response to receiving the selection of the zoom factor, automatically rescaling the strip chart to a degree of magnification commensurate with the zoom factor, wherein the furthest extremum value remains the bound of one side of the strip chart.

25. A method according to claim 24, wherein the step of recording the furthest extremum value comprises recording over the period of time furthest extremum maximum and minimum values of the measured quantity at the sample number rate and the strip chart is automatically rescaled such that the strip chart is bounded on one side by one of the furthest extremum maximum value or the furthest extremum minimum value and the other one of the furthest extremum maximum value or the furthest extremum minimum value is not displayed on the strip chart.

26. A method according to claim 21, further comprising:
displaying on the electronic display concurrently with the strip chart a bar graph, the bar graph to display a current value of the measured quantity.

27. A system for displaying a plurality of values of the measured quantity on a strip chart, the system comprising:
a means for receiving a selection to display a zoomed range of a measured quantity and receiving a selection of a sample number rate;
a means for recording over a period of time a furthest extremum value of the measured quantity at the sample number rate; and
a means for displaying a plurality of values of the measured quantity on the strip chart, wherein the furthest extremum value is used to automatically rescale the strip chart, providing for at least one bound of the zoomed range.

\* \* \* \* \*